March 2, 1965  F. K. PAULI  3,171,251
ROTATIONAL POWER PLANT

Filed March 14, 1963  3 Sheets-Sheet 1

Fritz K. Pauli,
INVENTOR.

BY Harry M. Aaragovitz
Edward J. Kelly
Herbert Berl
David H. Ward

Fritz K. Pauli,
INVENTOR.

BY Harry M. Saregovitz
Edward J. Kelly
Herbert Berl
David H. Ward

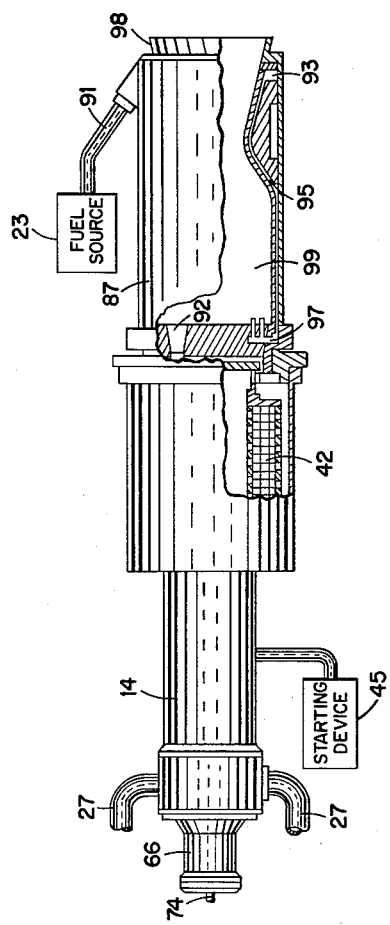

United States Patent Office 3,171,251
Patented Mar. 2, 1965

3,171,251
ROTATIONAL POWER PLANT
Fritz K. Pauli, Huntsville, Ala., assignor to the United States of America as represented by the Secretary of the Army
Filed Mar. 14, 1963, Ser. No. 265,604
7 Claims. (Cl. 60—35.6)
(Granted under Title 35, U.S. Code (1952), sec. 266)

The invention described herein may be manufactured and used by or for the Government for governmental purposes without the payment of any royalty thereon.

This invention relates to power plants and more particularly to a rotational power plant which serves as a propulsion means for a liquid propellant rocket or as a take-off aid for jet aircraft.

Heretofore power plants used for the propulsion of liquid rockets have consisted primarily of a combination of a feed system and a combustion chamber. The usual type of feed system has been a turbopump which is separated from the combustion chamber. It is well known that one advantage of a pumping system used with liquid propellant rockets is that it permits the liquid containers to be of minimum weight. This is because only a small amount of pressure is required to force the liquids into the suction lines of the pumps. Often pressurizing is not required and the liquids are fed into the pumps due to sufficient suction head by the static pressure of the fluids themselves. Normally the application for turbopumps is made when the required thrust is relatively large and the burning time is long.

For small and medium rocket propulsion units a high-pressure system is commonly used with the fluid containers to force the fluids directly into the combustion chamber. As a result the weight of the fluid containers is considerably larger than where a turbopump feed system is used.

For large power plants utilizing the turbopump system or the high-pressure system, the process for starting and stopping the power plants is not a difficult problem. The present invention provides a device whereby the turbopump and combustion chamber of a relatively small power plant are combined into one unit. This device is especially effective for small and medium size propulsion units within a thrust range of 10,000 to 100,000 pounds.

It is therefore an object of this invention to provide a power plant which combines the turbopump and the combustion chamber into one unit.

It is a further object of this invention to provide a rotary power plant which utilizes a reactant fluid and a catalyst which are thoroughly intermixed to produce a smooth and even decomposition.

Another object is to provide a rotary power plant which has a high thermal and mechanical efficiency.

Another object of this invention is to provide a power plant that is compact in construction.

It is still a further object of this invention to provide a unit which can easily be adapted for use with liquid propellants or as an additional power plant to assist in the take-off of jet aircraft.

According to the present invention the foregoing and other objects are attained by providing a power plant which combines a turbopump and combustion chamber into one unit. Liquid propellant is drawn through the hollow center of a cylindrical rotor which pressurizes the propellant and ejects it through holes in the rotor wall. After being forced through the injection holes in the rotor wall, the liquid propellant reacts with a circumferentially rotating catalyst which decomposes the liquid into steam. The steam drives a turbine wheel which is attached to the rotor and then exhausts through the nozzle to produce the thrust for the power plant unit.

The invention will be more fully understood through the following detailed description taken in conjunction with the accompanying drawings wherein like reference numerals designate identical or corresponding parts throughout the several views.

FIGURE 3 is an elevational side view, partly in section, of the power plant.

Figure 1:
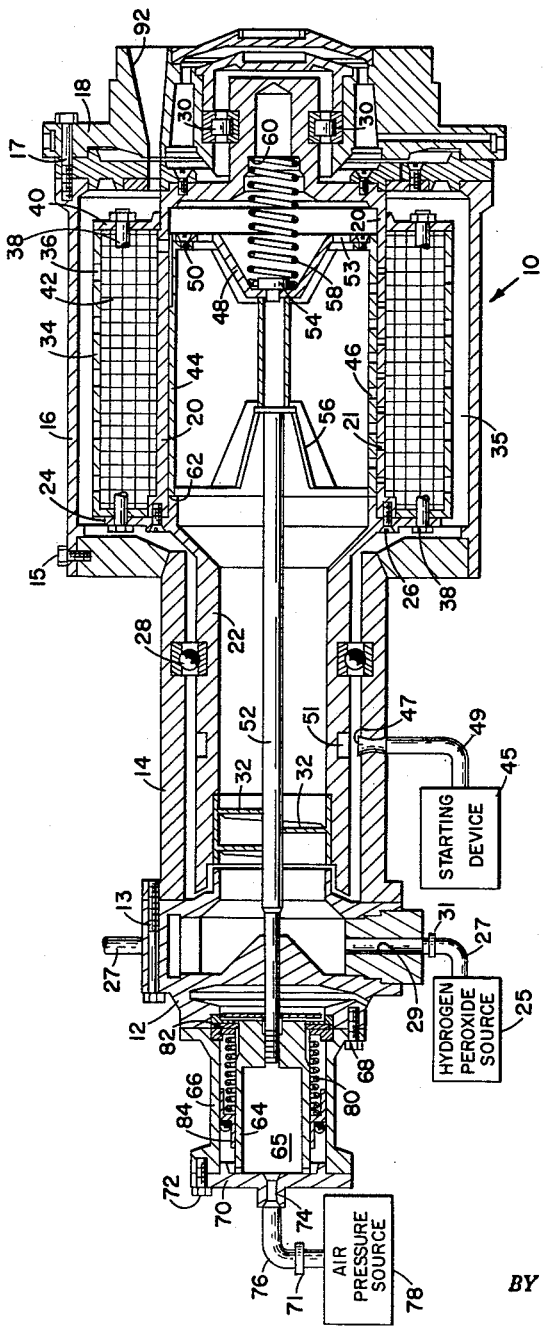
FIGURE 1 is an elevational longitudinal sectional view of the power plant.

The preferred embodiment of the invention is best illustrated by reference to FIGURE 1, showing a longitudinal cross section of a rotary power plant. A power plant 10 has an outer housing comprising an end section 12, a forward section 14, a central section 16 and an aft section 18 which are joined respectively by bolts 13, 15 and 17.

A hollow cylindrical rotor 20 having a plurality of holes 21 is enclosed by sections 16 and 18. A hollow shaft 22 has an integral flange 24 disposed for attachment to the forward end of rotor 20 by bolts 26. The combined rotor 20 and shaft 22 are supported by ball bearings 28 disposed between forward section 14 and shaft 22 and roller bearings 30 disposed between aft section 18 and rotor 20. A plurality of impeller blades 32 are secured to the inside of shaft 22 to assist the flow of a liquid, such as hydrogen peroxide through the inside of shaft 22 and rotor 20. A source of hydrogen peroxide 25 is connected by conduit 27 and valve 31 to an opening 29 in end section 12.

An annular housing 34 having a plurality of holes 36 surrounds the forward portion of the rotor and is attached to flange 24 by a plurality of bolts 38. A catalyst bed 42, such as a silverscreen package arranged in radial or spiral form, is contained within housing 34. A decomposition or combustion chamber 35 lies between central section 16 and housing 34.

A regulator piston 44 having a plurality of holes 46 is disposed for limited axial movement within rotor 20. A substantially U-shaped head 48 is secured to one end of piston 44 by a plurality of screws 50. A plurality of openings 53 are located in head 48 to permit free flow of the hydrogen peroxide on either side. One end of a shaft 52 is secured at the center of the U-shaped recess of head 48 by a bolt 54. Shaft 52, which extends beyond end section 12, is centered within rotor 20 by a brace member 56. A spring 58 has one end engaging the U-shaped recess of head 48 while the other end engages a centrally located countersunk recess 60 formed inside the forward end of rotor 20. When spring 58 is in an extended position the rear surface of piston 44 abuts against a stop 62 formed at the after end of shaft 22. In this position, as shown by FIGURE 1, the holes in rotor 20 are not aligned with the holes in piston 44, and therefore no liquid is able to flow through to catalyst bed 42. Regulator piston 44 is controlled by the movement of a piston-like member 64 which is slidably disposed in a housing 66. One end of housing 66 is secured by bolts 68 to the after end of end section 12. The other end of housing 66 is closed by an end plate 70 which is attached by bolts 72. An opening 74 in end plate 70 is connected by a conduit 76 to a source of air pressure 78. A three way valve 71 is placed in conduit 76 to provide an air vent from chamber 65 when the regulator piston is forced against stop 62 by spring 58.

The end of shaft 52 is threaded into member 64 so that these two members move in unison. A spring 80 encloses a portion of member 64 in order to urge regulator piston 44 in the position shown by FIGURE 1. One end of spring 80 abuts a flange member 82 which is integrally formed on housing 66. The other end of the spring engages one side of an S-shaped member 84 which is secured to member 64 in a suitable manner.

The outer surface of member 84 slidably engages the inner surface of housing 66.

Figure 2:
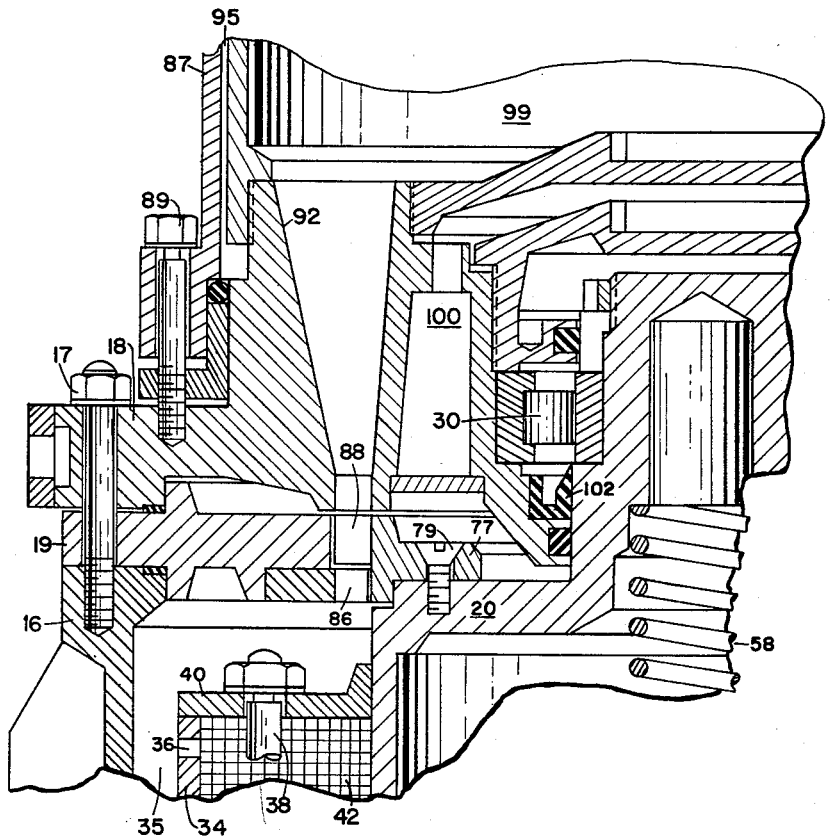
FIGURE 2 is an elevation view on an enlarged scale of the after end of the power plant.

Referring to FIGURE 2 stator blades 86 and turbine blades 88 are shown positioned in an annular passageway connecting decomposition chamber 35 with exhaust nozzle 92. The inclination of the stator blades and the turbine blades is relatively small since the horsepower performance required by the pumping system is comparatively low. Stator blades are attached to an inner surface of an annular member 19 which is secured between members 16 and 18 by bolts 17. Turbine blades 88 are mounted on an annular member 77 which in turn is attached to rotor 20 by screws 79. A portion of a conventional lubricating system indicated at 100 and a part of a conventional sealing system indicated at 102 are shown but do not form any part of the present invention.

Referring to FIGURES 2 and 3 a rocket motor 87 is shown attached by bolts 89 to after section 18. Rocket motor 87 is operated by a kerosene fuel and a hydrogen peroxide oxidizer. The hydrogen peroxide enters the power plant through conduits 27, flows through shaft 22 (FIGURE 1) and reacts with catalyst bed 42 to produce hot steam. The steam passes the stator blades driving turbine blades 88 and is ejected into the rocket motor combustion chamber 99. A source of kerosene fuel 23 is fed by a conduit 91 to an inlet 93 near the end of the rocket motor nozzle 98. The fuel then flows through an annular passageway 95 which provides cooling means for the rocket motor and then is ejected through injection ring 97. As a result of the superheated steam, the kerosene will automatically ignite after injection and burn in combustion chamber 99. The combustion gases then flow through nozzle 98 to produce a thrust having a high specific impulse. While hydrogen peroxide and kerosene have been disclosed in this embodiment of the invention, it will be apparent to one skilled in the art that other oxidizers (and compatible catalysts) and fuels could be substituted for those herein disclosed.

A table describing the important data of rotational power plant operated by hydrogen peroxide and kerosene is given below:

| | |
|---|---|
| Oxidizer | Hydrogen peroxide 80% concentration. |
| Specific gravity | 83.5 lb./cu. ft. |
| Consumption | 29.8 lb./sec. |
| Fuel | Kerosene. |
| Specific gravity | 50.0 lb./cu. ft. |
| Consumption | 4.20 lb./sec. |
| Total consumption | 34.0 lb./sec. |
| Specific impulse | 220 sec. |
| Nominal thrust | 7500 lb. |
| Mixture ratio | 7.1. |
| Rotor pressure | 740 p.s.i. |
| Rotor revolutions | 15,100 r.p.m. |
| Decomposition chamber pressure | 655 p.s.i. |
| Combustion chamber pressure | 580 p.s.i. |
| Decomposition chamber temperature | 920° F. |
| Combustion chamber temperature | 4350° F. |
| Kerosene pressure | 1000 p.s.i. |

The operation of the power plant is started through the aid of a starting device 45. This device includes a source of pressurized air which is fed to a nozzle 47 through a conduit 49. The high pressure jet of air exhausting through nozzle 47 ejects against a starter wheel 51 which turns rotor 20 at a low angular velocity and starts the power plant operation. Immediately prior to this starting operation, valve 31 is opened to allow hydrogen peroxide to enter rotor 20. As the rotor begins to turn, impeller blades 32 force the liquid through the rotor towards regulator piston 44. The regulator piston is controlled by 3-way control valve 71 which is provided in conduit 76 near pressure source 78. When pressure is exerted on member 64 regulator piston 44 moves to the right so that the hydrogen peroxide will flow through holes 46 in the regulator piston and holes 21 in the rotor. The hydrogen peroxide then reacts with catalyst bed 42 which is attached to the rotor and rotates therewith. This rotation assures a uniform flow of hydrogen peroxide through the catalyst bed and results in a more complete decomposition into steam. As more clearly shown in FIGURE 2 the steam then flows through holes 36 into decomposition chamber 35 and then by stator blades 86 to drive turbine blades 88. The steam then exhausts through nozzles 92 to provide thrust to the power plant. Instead of using this rotational power plant as a jet-assist device for aircraft, the power plant may have a rocket motor 87 attached to one end as shown in FIGURES 2 and 3.

Obviously, numerous modifications and variations of the present invention are possible in the light of the above teachings. It is therefore to be understood that within the scope of the appended claims the invention may be practiced otherwise than as specially described herein.

I claim:
1. A jet propulsion device comprising:
   (a) a stationary outer housing and a rotatable inner member,
   (b) starting means for providing initial rotation to said inner member,
   (c) an annular decomposition chamber disposed between said housing and said member,
   (d) a plurality of exhaust nozzles disposed between said housing and said member at one end of said propulsion device,
   (e) passage defining means between said decomposition chamber and said nozzles including a portion of said housing and a ring of turbine blades mounted on said inner member,
   (f) catalyst means attached to said inner member and disposed for rotation within said decomposition chamber,
   (g) said inner member containing a fluid which reacts with said catalyst means to produce a reactant gas which discharges into said passage defining means,
   (h) said turbine blades being driven by the discharge of said gas; and
   (i) said gas being discharged out said nozzles to produce a propelling thrust.
2. A device as set forth in claim 1 with:
   regulating means disposed within said inner member for controlling the flow of said fluid to said catalyst means.
3. A device as set forth in claim 2 with:
   (a) said outer housing comprising a plurality of substantially cylindrical, interconnected sections, including first and second end sections,
   (b) said first end section having a recess for enclosing one end of said inner member,
   (c) said exhaust nozzles being contained within said first end section,
   (d) first bearing means disposed in said recess for support of said inner member,
   (e) second bearing means disposed between said inner member and a first of said plurality of sections for support of said inner member; and
   (f) said second end section providing inlet means for said fluid and having an annular flange for supporting the other end of said inner member.
4. A device as set forth in claim 3 with:
   (a) said inner member comprising an elongated cylindrical rotor having a hollow cylindrical shaft attached thereto,

(b) said rotor having a larger diameter than said shaft,
(c) said rotor having a plurality of injection holes extending through the outer wall thereof,
(d) one end of said rotor having a closed end for containing said fluid; and
(e) said shaft having a plurality of impeller blades attached to the inside wall thereof for moving said fluid toward said injection holes.

5. A device as set forth in claim 4 with:
(a) said regulating means comprises a first piston-shaped cylinder slidably engaging the inner wall of said rotor section,
(b) said cylinder having a central piston rod extending through said rotor and said shaft,
(c) a cup-shaped member attached to the outer end of said second end section providing a central recess therein,
(d) a second piston-shaped cylinder attached to the end of said piston rod and slidably disposed within said central recess,
(e) one end of said cup-shaped member having an opening therein,
(f) a pressurized source of gas connected to said opening for controlling the movement of said second piston-shaped cylinder,
(g) said first piston-shaped cylinder having a plurality of openings,
(h) said injection holes being aligned with said openings in a first position of said first cylinder, and said holes being closed by the wall of said first cylinder in a second position of said first cylinder; and
(i) spring means engaging each of said cylinders so that said injection holes are normally closed by the wall of said first cylinder to prevent the flow of said fluid.

6. A device as set forth in claim 1 with:
(a) a rocket motor having substantially the same diameter as said outer member and attached to the end of said propulsion device so that said rocket motor encloses said exhaust nozzles,
(b) a pressurized source of fuel,
(c) means for supplying said fuel to said rocket motor,
(d) means for injecting said fuel into said rocket motor for combustion with said gases for producing thrust gases in said rocket motor; and
(e) a thrust nozzle contained at one end of said rocket motor for exhausting said thrust gases.

7. A device as set forth in claim 1 wherein:
(a) said starting means includes a pressurized source of gas,
(b) injection means disposed in said outer housing,
(c) a conduit connecting said source of gas to said injection means,
(d) said inner member having an outer wheel member; and
(e) said injection means providing thrust to rotate said wheel member.

References Cited by the Examiner

UNITED STATES PATENTS 2,548,268  4/51  Metsger _____ 60—50 X
3,091,520  5/63  Newbern _____ 60—35.6 X SAMUEL LEVINE, *Primary Examiner.*